United States Patent
Yin et al.

(10) Patent No.: US 8,908,601 B2
(45) Date of Patent: Dec. 9, 2014

(54) PAGING PROCESSING METHOD, COMMUNICATION APPARATUS, AND COMMUNICATION SYSTEM

(75) Inventors: Yu Yin, Shanghai (CN); Caixia Qi, Shangjai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 202 days.

(21) Appl. No.: 13/333,746

(22) Filed: Dec. 21, 2011

(65) Prior Publication Data

US 2012/0087313 A1 Apr. 12, 2012

Related U.S. Application Data

(63) Continuation of application No. PCT/CN2010/073827, filed on Jun. 11, 2010.

(30) Foreign Application Priority Data

Jun. 26, 2009 (CN) .......................... 2009 1 0148424

(51) Int. Cl.
*H04W 4/00* (2009.01)
*H04W 48/16* (2009.01)
*H04W 68/00* (2009.01)
*H04W 72/12* (2009.01)

(52) U.S. Cl.
CPC .......... *H04W 48/16* (2013.01); *H04W 72/1278* (2013.01); *H04W 68/005* (2013.01); *H04W 68/00* (2013.01)
USPC ........................................................ 370/328

(58) Field of Classification Search
None
See application file for complete search history.

(56) References Cited

U.S. PATENT DOCUMENTS

| | | |
|---|---|---|
| 2006/0172722 A1 | 8/2006 | Christensen et al. |
| 2007/0060175 A1* | 3/2007 | Park et al. ..................... 455/458 |
| 2009/0318147 A1* | 12/2009 | Zhang et al. ............... 455/435.1 |
| 2011/0317560 A1* | 12/2011 | Aramoto et al. .............. 370/235 |
| 2012/0084449 A1* | 4/2012 | Delos Reyes et al. ........ 709/229 |

FOREIGN PATENT DOCUMENTS

| | | |
|---|---|---|
| CN | 1771743 A | 5/2006 |
| CN | 1921680 A | 2/2007 |
| CN | 1921684 A | 2/2007 |
| CN | 101511087 A | 8/2009 |

OTHER PUBLICATIONS

Author Unknown, 3GPP TS 23.401 Version 9.1.0, Jun. 10, 2009, pp. 1-234.*
Third Office Action of Chinese Application No. 200910148424.1 mailed Jun. 28, 2013, 8 pages. (Partial Translation).

(Continued)

*Primary Examiner* — Christopher Crutchfield
(74) *Attorney, Agent, or Firm* — Slater & Matsil, L.L.P.

(57) ABSTRACT

A paging processing method, a communication apparatus, and a communication system are disclosed, which can improve the quality of service provided to a user equipment. The paging processing method includes: receiving, by a mobility management network element, a downlink data notification message which includes service attribute information of a downlink data packet; obtaining the service attribute information; and initiating paging of the user equipment based on different policies according to the service attribute information. Accordingly, embodiments of the present invention also provide a communication apparatus and a communication system.

10 Claims, 6 Drawing Sheets

(56) References Cited

OTHER PUBLICATIONS

Chinese Office Action and Translation received in Chinese Application No. 200910148424.1, mailed Jul. 4, 2012, 17 pages.
International Search Report and Translation received in Patent Cooperation Treaty Application No. PCT/CN2011/073827, mailed Sep. 23, 2010, 4 pages.
Written Opinion received in Patent Cooperation Treaty Application No. PCT/CN2011/073827, mailed Sep. 23, 2010, 3 pages.
3rd Generation Partnership Project, "Technical Specification Group Services and System Aspects; General Packet Radio Service (GPRS) Enhancements for Evolved Universal Terrestrial Radio Access Network (E-UTRAN) Access (Release 9)," 3GPP TS 23.401, v9.1.0, Jun. 2009, 234 pages.

* cited by examiner

PAGING PROCESSING METHOD, COMMUNICATION APPARATUS, AND COMMUNICATION SYSTEM

CROSS-REFERENCE TO RELATED APPLICATIONS

This application is a continuation of International Application No. PCT/CN2010/073827, filed on Jun. 11, 2010, which claims priority to Chinese Patent Application No. 200910148424.1, filed on Jun. 26, 2009, both of which are incorporated herein by reference in their entireties.

FIELD OF THE INVENTION

The present invention relates to the field of communication technologies, and in particular, to a paging processing method, a communication apparatus, and a communication system.

BACKGROUND OF THE INVENTION

In a mobile communication system, a user equipment (UE, User Equipment) attached to the network may be in two states: connected state and idle state. When the user equipment is in the connected state, user plane data packets can be transmitted directly between the user equipment and the network side. When the user equipment is in the idle state, the network side releases resources allocated to the user equipment. If the network side needs to send data packets to a user equipment in the idle state, the network side pages the user equipment and triggers the user equipment to initiate a service request procedure to restore the signaling connection and user plane bearers between the network side and the user equipment.

When a serving gateway (SGW, Serving Gateway) on the network side receives a downlink data packet for the user equipment, if the serving gateway finds that the downlink tunnel is invalid, the serving gateway buffers the data packet and sends a downlink data notification message to a mobility management network element. The downlink data notification message is generally used to indicate the mobility management network element to restore the radio access bearer of a user equipment. If the user equipment is in the idle state, where the signaling connection between the user equipment and the network is released, the mobility management network element pages the user equipment, so that the user equipment initiates a service request procedure according to the paging to restore the signaling connection with the network side and the radio access bearers of the user plane bearers on the air interface side. Then, the SGW sends the buffered data packet to the UE.

During the research and practice of the method, the inventor of the present invention finds that the prior art has the following problems:

In the prior art, the downlink data notification message, which is sent by the serving gateway to the mobility management network element, includes only a tunnel endpoint ID (TEID, Tunnel Endpoint ID) allocated by the mobility management network element to the serving gateway; the mobility management network element can locate the called user equipment according to the TEID to page the user equipment, but the mobility management network element cannot differentiate the service attribute of the user equipment. For example, the mobility management network element cannot differentiate which type of service of the user equipment has triggered the paging. As a result, the mobility management network element cannot perform differentiated processing on the paging, but follow a uniform principle, thus deteriorating the quality of service provided to the subscriber.

SUMMARY OF THE INVENTION

Embodiments of the present invention provide a paging processing method, a communication apparatus, and a communication system which can improve the quality of service provided to the user equipment.

A paging processing method provided in an embodiment of the present invention includes:

receiving, by a mobility management network element, a downlink data notification message, where the downlink data notification message includes service attribute information of data;

obtaining the service attribute information; and initiating paging of a user equipment based on different policies according to the service attribute information.

A communication apparatus provided in an embodiment of the present invention includes:

a receiving unit, configured to receive a downlink data notification message, where the downlink data notification message includes service attribute information of data;

an information unit, configured to obtain the service attribute information; and a processing unit, configured to initiate paging of a user equipment based on different policies according to the service attribute information.

A communication apparatus provided in an embodiment of the present invention includes:

a generating unit, configured to generate a downlink data notification message, where the downlink notification message includes service attribute information of data; and a sending unit, configured to send the notification message generated by the generating unit, so that a mobility management network element initiates paging of a user equipment based on different policies according to the service attribute information.

A communication system provided in an embodiment of the present invention includes:

a first communication apparatus, configured to send a downlink data notification message, where the downlink notification message includes service attribute information of data; and a second communication apparatus, configured to receive the downlink data notification message sent by the first communication apparatus, obtain the service attribute information included in the downlink data notification message, and initiate paging of a user equipment based on different policies according to the service attribute information.

As seen above, in the technical solution of the embodiments of the present invention, the service attribute information of data is included in a downlink data notification message, and after the service attribute information is obtained, paging of a user equipment based on different policies may be initiated according to the service attribute information, which overcomes the defect caused by the use of a uniform paging policy because services cannot be differentiated in the prior art and enables prior establishments of some important services and services with high priority, thus improving the quality of service provided to the subscriber and saving the cost of paging the user equipment by the network side.

DETAILED DESCRIPTION OF THE EMBODIMENTS

The embodiments of the present invention provide a paging processing method which can improve the quality of service provided to a user equipment. Accordingly, the embodiments of the present invention also provide a communication apparatus and a communication system. The embodiments of the present invention are described in detail hereinafter.

Figure 1:
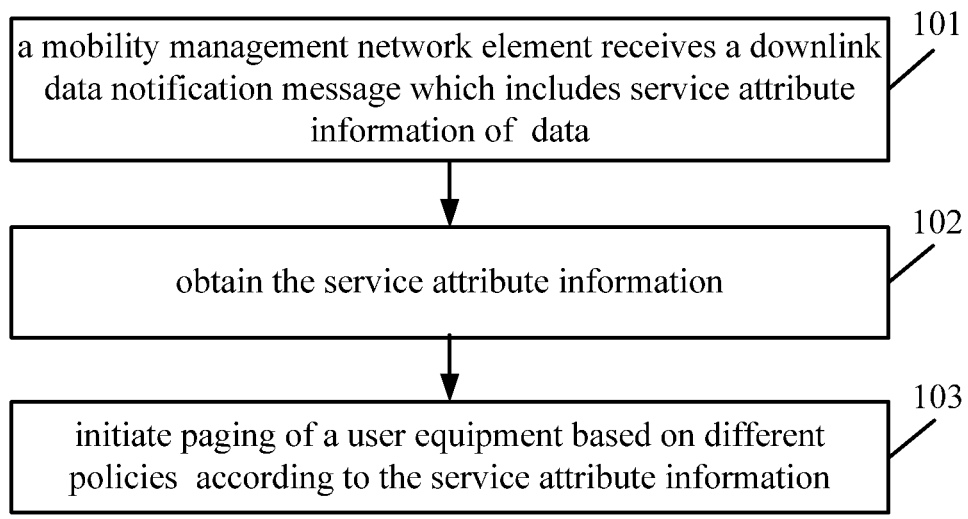
FIG. 1 is a flowchart of a paging processing method according to Embodiment 1 of the present invention.

FIG. 1 is a flowchart of a paging processing method according to Embodiment 1 of the present invention, including the following steps:

Step 101: A mobility management network element receives a downlink data notification message, where the downlink data notification message includes service attribute information of data.

Step 102: Obtain the service attribute information.

Step 103: Initiate paging of the user equipment based on different policies according to the service attribute information.

Wherein, the service attribute information of data included in the downlink data notification message includes at least one of the following items: access point name APN, evolved packet system bearer identity EBI, quality of service class identifier QCI, linked bearer identity LBI, and service identifier SI.

The initiating paging of the user equipment based on different policies according to the service attribute information includes:

initiating paging of the user equipment based on different policies according to the APN, QCI, or SI;

locating the bearer context according to the EBI to obtain the corresponding APN or QCI and initiating paging of the user equipment based on different policies according to the APN or QCI; or locating the bearer context according to the LBI to obtain the corresponding APN and initiating paging of the user equipment based on different policies according to the APN.

Or, the service attribute information of data included in the downlink data notification message includes at least one of the following items: IP address, protocol type, port number, IP security IPSec parameter index, differentiated services codepoint priority DSCP/type of service TOS, flow label Flow Label, service type, and service feature of the data packet.

The initiating paging of the user equipment based on different policies according to the service attribute information includes:

initiating paging of the user equipment based on different policies according to the service type or service feature;

obtaining the service type according to a pre-configured mapping relationship between the service type and the IP address, protocol type, port number, IPSec parameter index, DSCP/TOS or Flow Label of the data packet, and initiating paging of the user equipment based on different policies according to the service type; or obtaining the service feature according to a pre-configured mapping relationship between the service feature and the IP address, protocol type, port number, IPSec parameter index, DSCP/TOS or Flow Label of the data packet, and initiating paging of the user equipment based on different policies according to the service feature.

From the Embodiment 1, it is apparent that, in the technical solution of the embodiment of the present invention, the service attribute information of data is included in a downlink data notification message, and after the service attribute information is obtained, paging of the user equipment based on different policies may be initiated according to the service attribute information, which overcomes the defect caused by the use of a uniform paging policy because services cannot be differentiated in the prior art and enables prior establishments of some important services and services with high priority, thus improving the quality of services provided to the user equipment and saving the cost of paging the user equipment by the network side.

The technical solution provided by the embodiments of the present invention is described hereunder in detail.

Figure 2:
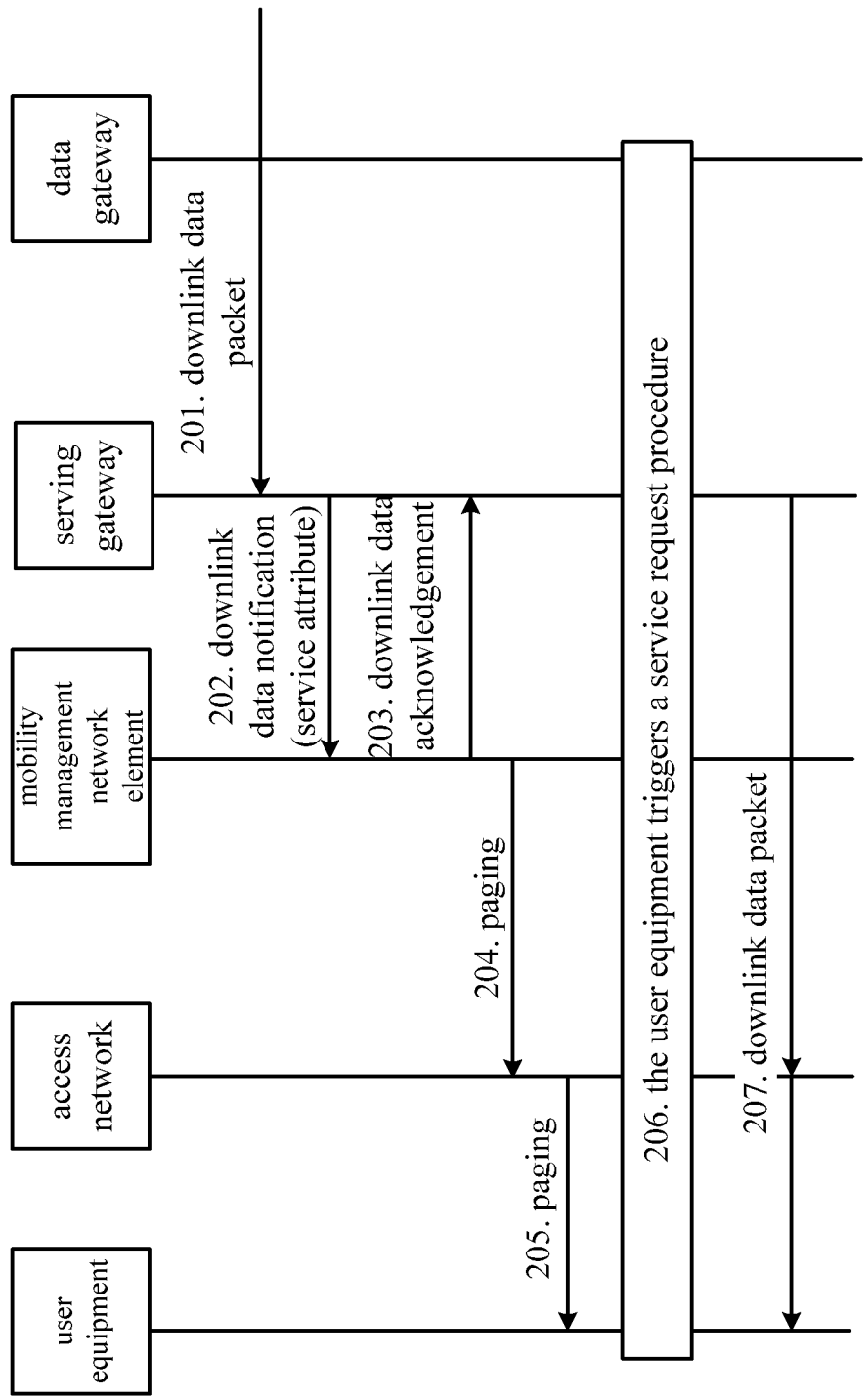
FIG. 2 is a flowchart of a paging processing method according to Embodiment 2 of the present invention.

FIG. 2 is a flowchart of a paging processing method according to Embodiment 2 of the present invention.

This embodiment of the present invention takes an evolved packet system(Evolved Packet System) as an example. In FIG. 2, the mobility management network element may be a mobility management entity (MME, Mobility Management Entity) or serving GPRS support node (SGSN, Serving GPRS Support Node), the serving gateway stands for an SGW (Serving Gateway); the user equipment stands for a UE; and the data gateway stands for a PGW (Public Data Network Gateway).

FIG. 2 mainly includes the following steps:

Step 201: The serving gateway receives a data packet and obtains service attribute information corresponding to the data packet.

After receiving a downlink data packet from the data gateway, the serving gateway knows that the downlink tunnel corresponding to the data packet is invalid, and then the serving gateway buffers the data packet and obtains the service attribute information corresponding to the data packet. The service attribute information may be at least one of the following items: access point name (APN, Access Point Name), evolved packet system bearer identity (EBI, EPS Bearer Identity), quality of service class identifier (QCI, QoS Class Identifier), linked bearer identity (LBI, Linked Bearer Identity) and service identifier (SI, Service Identifier).

The serving gateway may obtain the service attribute information corresponding to the data packet in one of the following ways:

(1) The serving gateway locates the user context or bearer context corresponding to the data packet according to the tunnel endpoint ID in the downlink data packet to know that the downlink tunnel corresponding to the data packet is invalid, and then obtains the service attribute information stored in the user context or bearer context, for example, at least one of APN, EBI, QCI, and LBI;

(2) The serving gateway matches the downlink service data flow filter (SDFF, Service Data Flow Filter) or downlink traffic flow template (TFT, Traffic Flow Template) stored on the serving gateway according to protocol header information such as the source IP address, destination IP address, source port number, destination port number, and protocol number in the downlink data packet, and locates the corresponding downlink service data flow context according to the downlink service data flow filter to know that the downlink tunnel corresponding to the data packet is invalid, and then the serving gateway obtains the service attribute information stored in the service data flow context, for example, at least one of APN, EBI, QCI, LBI, and SI; or the serving gateway locates the corresponding bearer context according to the downlink traffic flow template to know that the downlink tunnel corresponding to the data packet is invalid, and then obtains the service attribute information stored in the bearer context, for example, at least one of APN, EBI, QCI, and LBI.

Step 202: The serving gateway sends a downlink data notification message that includes the service attribute information to the mobility management network element.

The serving gateway sends the service attribute information to the mobility management network element via a downlink data notification message. The service attribute information is at least one of APN, EBI, QCI, LBI and SI.

Step 203: The mobility management network element sends a downlink data acknowledgement message to the serving gateway, acknowledging reception of the downlink data notification message sent by the serving gateway.

Steps 204 and 205: The mobility management network element uses different paging policies to page the user equipment in the idle state according to the service attribute information.

In an EPS network, when a user equipment changes from the idle state to the connected state, all radio access bearers of the user plane bearers of the user equipment will be restored, which means that, when the downlink tunnel corresponding to the serving gateway or data packet is invalid (that is, radio access bearers are released), the user equipment is definitely in the idle state. That is, when the mobility management network element receives the downlink data notification message from the serving gateway, the user equipment is definitely in the idle state. Then, the mobility management network element needs to perform the paging of the user equipment.

After obtaining the service attribute information, the mobility management network element uses different paging policies to page the user equipment in the idle state, according to the different service attribute information such as APN or EBI.

If the included service attribute information is an APN, the mobility management network element initiates paging to the user equipment preferentially for a service data flow of an IP multimedia subsystem (IMS, IP Multimedia Subsystem) corresponding to the APN.

If the included service attribute information is a QCI, the mobility management network element initiates paging to the user equipment for a service data flow with QCI=6 preferentially or initiates paging to the user equipment for a service data flow of voice call preferentially.

If the included service attribute information is an SI, the mobility management network element initiates paging to the user equipment preferentially for a service data flow with a higher SI class.

If the included service attribute information is an EBI, the mobility management network element locates the stored bearer context according to the EBI, obtains the APN or QCI corresponding to the downlink data packet that triggers the paging from the bearer context, and then initiates different paging according to the APN or QCI.

If the included service attribute information is an LBI, the mobility management network element locates the default bearer context according to the LBI, obtains the APN corresponding to the downlink data packet that triggers the paging from the default bearer context, and then initiates different paging according to the APN.

Step 206: After the user equipment receives the paging, the user equipment initiates a service request procedure to restore the signaling connection and user plane bearers with the network side, and changes to the connected state.

Step 207: After the downlink tunnel is valid, the serving gateway sends the buffered data packet to the user equipment.

From the second embodiment, it is apparent that, in the technical solution of the embodiment of the present invention, the downlink data notification message sent to the mobility management network element includes at least one of APN, EBI, QCI, LBI, and SI as the content of service attribute information, and after obtaining the service attribute information, the mobility management network element may initiate paging of the user equipment based on different policies according to the service attribute information, which overcomes the defect caused by the use of a uniform paging policy because services cannot be differentiated in the prior art and enables prior establishments of some important services and the services with high priority, thus improving the quality of service provided to the subscriber, increasing the success rate of paging, reducing the number of paging attempts, and saving the cost of paging the user equipment by the network side.

Figure 3:
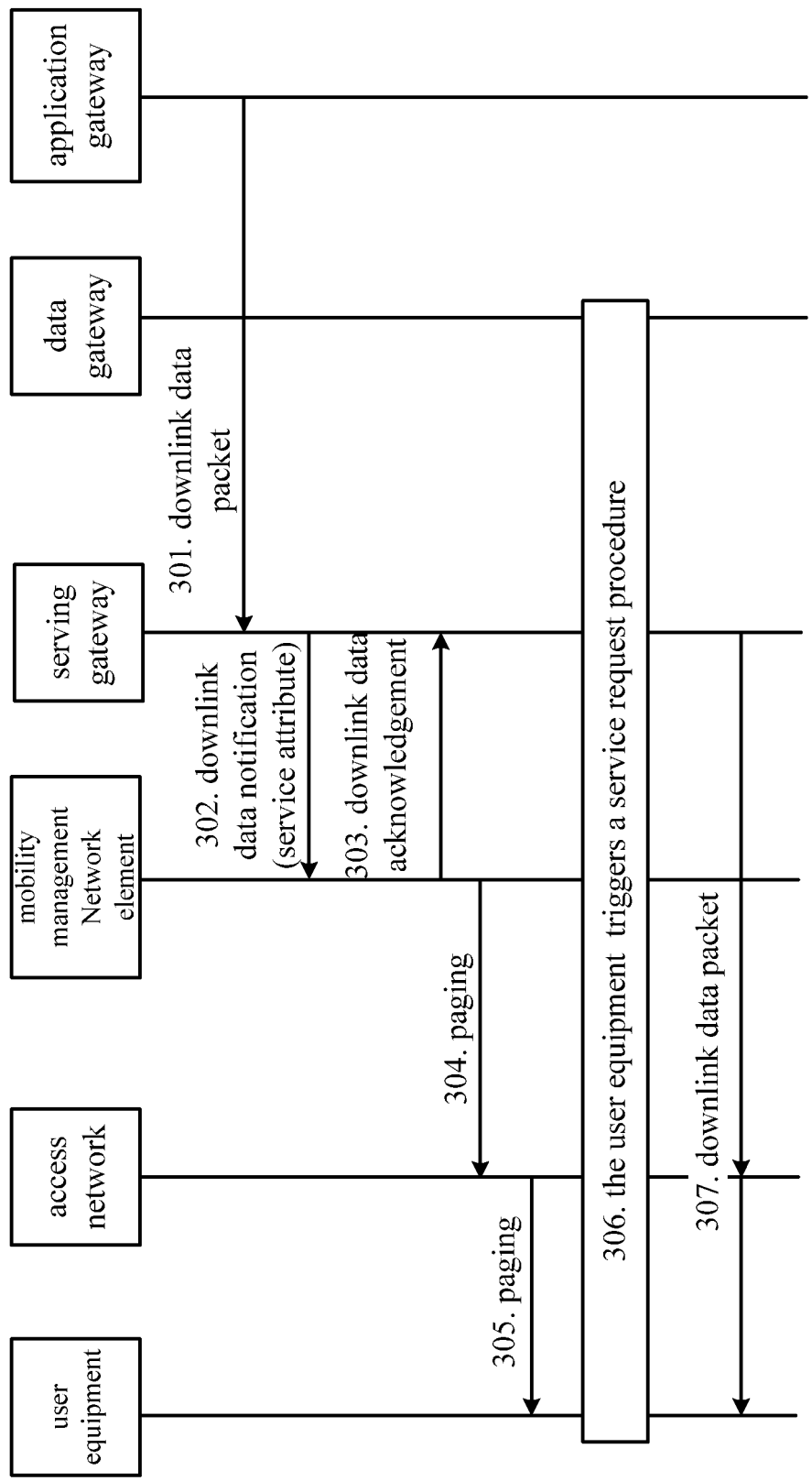
FIG. 3 is a flowchart of a paging processing method according to Embodiment 3 of the present invention.

FIG. 3 is a flowchart of a paging processing method according to a third embodiment of the present invention.

In FIG. 3, the mobility management network element may be an MME or an SGSN; the serving gateway stands for an SGW; the user equipment stands for a UE; the data gateway stands for a PGW and the application gateway may be an application function (AF, Application Function) or a proxy-call session control function (P-CSCF, Proxy-Call Session Control Function).

The third embodiment considers the circumstance where the serving gateway cannot differentiate data packets of different services. Because data packets of different services may be transmitted over the same bearer or correspond to the same downlink service data flow filter, the serving gateway may fail to differentiate the data packets of different services in granularity of bearer level or service data flow filter level. For example, to an evolved packet system (EPS, Evolved Packet System) network, both the voice over IP (VoIP, Voice over IP) invite (Invite) message and the short message (SMS, Short Message) over IP service of a mobile terminating user equipment are the session initiation protocol (SIP, Session Initiation Protocol) signaling message sent by the P-CSCF. The SIP signaling messages are transmitted over the same bearer or correspond to the same downlink service data flow filter. Therefore, when the serving gateway receives an SIP signaling encapsulated data packet, the serving gateway is unable to differentiate, according to at least one of APN, EBI, QCI, LBI, and SI, whether the data packet corresponds to the signaling message of voice call or short message service. If the serving gateway sends at least one of APN, EBI, QCI, LBI, and SI to the mobility management network element directly, the mobility management network element is also unable to differentiate the services. Therefore, the service type corresponding to some parameters, such as the IP address, protocol type, port number, IP security (IPSec, IP Security) parameter index, differentiated services codepoint priority (DSCP, Differentiated Services Codepoint Priority)/ type of service (TOS, Type of Service), or flow label (Flow Label) of the data packet, or the service feature corresponding to the IP address, protocol type, port number, IP security (IPSec, IP Security) parameter index, differentiated services codepoint priority (DSCP, Differentiated Services Codepoint Priority)/type of service (TOS, Type of Service), or flow label (Flow Label) of the data packet of the data packet, may be pre-configured on the serving gateway or the mobility management network element, and then services may be differentiated according to these parameters.

FIG. 3 mainly includes the following steps:

Step 301: The serving gateway receives a data packet and obtains service attribute information corresponding to the data packet.

The serving gateway receives a downlink data packet sent by the application gateway via the data gateway.

In this embodiment of the present invention, with respect to the signaling message of voice call and short message service, the application gateway uses at least one different parameter in IP address, port number, IPSec parameter index, DSCP/TOS, and Flow Label to encapsulate the downlink data packet. The service type or service feature corresponding to these parameters may be pre-configured on the serving gateway or pre-configure on the mobility management network element.

Taking DSCP/TOS or Flow Label as an example, different bits in the DSCP/TOS or Flow Label field may be used to indicate different service types. For example, the value "1" of the first bit in the field indicates the signaling message of voice call and the value "1" of the second bit indicates the message of short message service; or the enumerated values of DSCP/TOS or Flow Label may be used to differentiate the services. For example, the value "10" indicates the signaling message of voice call and the value "17" indicates the message of short message service.

After receiving a downlink data packet and knowing that the downlink tunnel corresponding to the data packet is invalid, the serving gateway buffers the data packet and obtains the service attribute information corresponding to the data packet. The service attribute information may be at least one of the following items: IP address, protocol type, port number, IPSec parameter index, DSCP/TOS, Flow Label, service type, and service feature of the data packet, as detailed hereunder.

(1) The serving gateway locates the user context or bearer context corresponding to the data packet according to the tunnel endpoint ID in the downlink data packet to know that the downlink tunnel corresponding to the data packet is invalid, and then the serving gateway obtains at least one of IP address, port number, IPSec parameter index, DSCP/TOS, and Flow Label of the data packet directly from the downlink data packet as the service attribute information. The serving gateway may obtain the service attribute information after a deep packet inspection according to the length or feature of the data packet. In the method, the serving gateway obtains the DSCP/TOS or Flow Label at the inner IP layer as the service attribute information. The inner IP layer is an IP layer where the destination address is the IP address of the user equipment.

(2) The serving gateway matches the downlink service data flow filter (SDFF, Service Data Flow Filter) or downlink traffic flow template (TFT, Traffic Flow Template) stored on the serving gateway according to protocol header information such as the source IP address, destination IP address, source port number, destination port number, and protocol number in the downlink data packet, and locates the corresponding downlink service data flow context according to the downlink service data flow filter to know that the downlink tunnel corresponding to the data packet is invalid, and then the serving gateway obtains at least one of IP address, port number, IPSec parameter index, DSCP/TOS, and Flow Label of the data packet directly from the downlink data packet as the service attribute information; or the serving gateway locates the corresponding bearer context according to the downlink traffic flow template to know that the downlink tunnel corresponding to the data packet is invalid, and then obtains at least one of IP address, port number, IPSec parameter index, DSCP/TOS, and Flow Label of the data packet directly from the downlink data packet as the service attribute information. The serving gateway may obtain the service attribute information after a deep packet inspection according to the length or feature of the data packet.

Further, the serving gateway can know the connection type corresponding to the data packet according to the information such as APN stored in the downlink service data flow context, or bearer context, or user context. Corresponding to the specific connection type, such as the connection of IMS services, the serving gateway may perform a deep packet inspection according to the length or feature of the data packet to obtain at least one of the following items: IP address, protocol type, port number, IPSec parameter index, DSCP/TOS, and Flow Label of the data packet.

(3) Based on (1) and (2), the serving gateway obtains the service type according to the mapping relationship between the service type and the IP address, protocol type, port number, IPSec parameter index, DSCP/TOS, or Flow Label of the data packet, and uses the obtained service type as the service attribute information.

(4) Based on (1) and (2), the serving gateway obtains the service feature according to the mapping relationship between the service feature and the IP address, protocol type, port number, IPSec parameter index, DSCP/TOS, or Flow Label of the data packet, and uses the obtained service feature as the service attribute information.

Step 302: The serving gateway sends a downlink data notification message that includes the service attribute information to the mobility management network element.

The serving gateway sends the service attribute information to the mobility management network element via a downlink data notification message. The service attribute information may be at least one of the following items: IP address, protocol type, port number, IPSec parameter index, DSCP/TOS, Flow Label, service type, and service feature of the data packet.

The service type may be described by an enumerated value. For example, the enumerated value "10" indicates the signaling message of voice call and the enumerated value "17" indicates short message service. Or, the service type may be expressed by different bits in a field. For example, the value "1" of the first bit indicates the signaling message of voice call and the value "1" of the second bit indicates short message service.

The service feature (such as the service with high priority or short waiting time) may be described by one enumerated value. For example, the enumerated value "1" indicates the service of a high priority or short waiting time, and the enumerated value "2" indicates the service of a low priority or long waiting time; or the service feature may be expressed by different bits in a field. For example, the value "1" of the first bit indicates the service of a high priority or short waiting time, and the value "1" of the second bit indicates the service of a low priority or long waiting time. This is not limited by the embodiment of the present invention.

Step 303: The mobility management network element sends a downlink data acknowledgement message to the serving gateway, acknowledging reception of the downlink data notification message sent by the serving gateway.

Steps 304 and 305: The mobility management network element uses different paging policies according to the service attribute information to page the user equipment in the idle state.

After obtaining the service attribute information, the mobility management network element uses different paging policies according to the different service attribute information to page the user equipment in the idle state. For voice call and short message service differentiated according to the service attribute information, when resources are congested, the mobility management network element initiates paging for the service data flow of voice call preferentially. The paging for a voice call may be sent in the entire tracking area list (TA List, Tracking Area List) from the beginning, and the paging for short message service is sent first in a TA in the TA list where the UE is more probably located.

If the included service attribute information is at least one of the parameters of IP address, port number, IPSec parameter index, DSCP/TOS, or Flow Label of the data packet, the mobility management network element needs to pre-configure the service type corresponding to the parameters or pre-configure the service feature corresponding to the parameters. Thereby, the service type or service feature may be differentiated according to the mapping relationship and then different paging policies can be used according to the service type or service feature to page the user equipment in the idle state.

Step 306: After the user equipment receives the paging, the user equipment initiates a service request procedure to restore the signaling connection and user plane bearers with the network side and transits to the connected state.

Step 307: After the downlink tunnel is valid, the serving gateway sends the buffered data packet to the user equipment.

From the third embodiment, it is apparent that, in the technical solution of the embodiment of the present invention, the downlink data notification message sent to the mobility management network element includes at least one of IP address, protocol type, port number, IPSec parameter index, DSCP/TOS, Flow Label, service type, and service feature of the data packet as the content of service attribute information, and after obtaining the service attribute information, the mobility management network element may initiate paging of the user equipment based on different policies according to the service attribute information, which overcomes the defect caused by the use of a uniform paging policy because services cannot be differentiated in the prior art and enables prior establishments of some important services and the services with high priority, thus improving the quality of service provided to the subscriber and reducing the cost of paging the user equipment by the network side.

Figure 4:
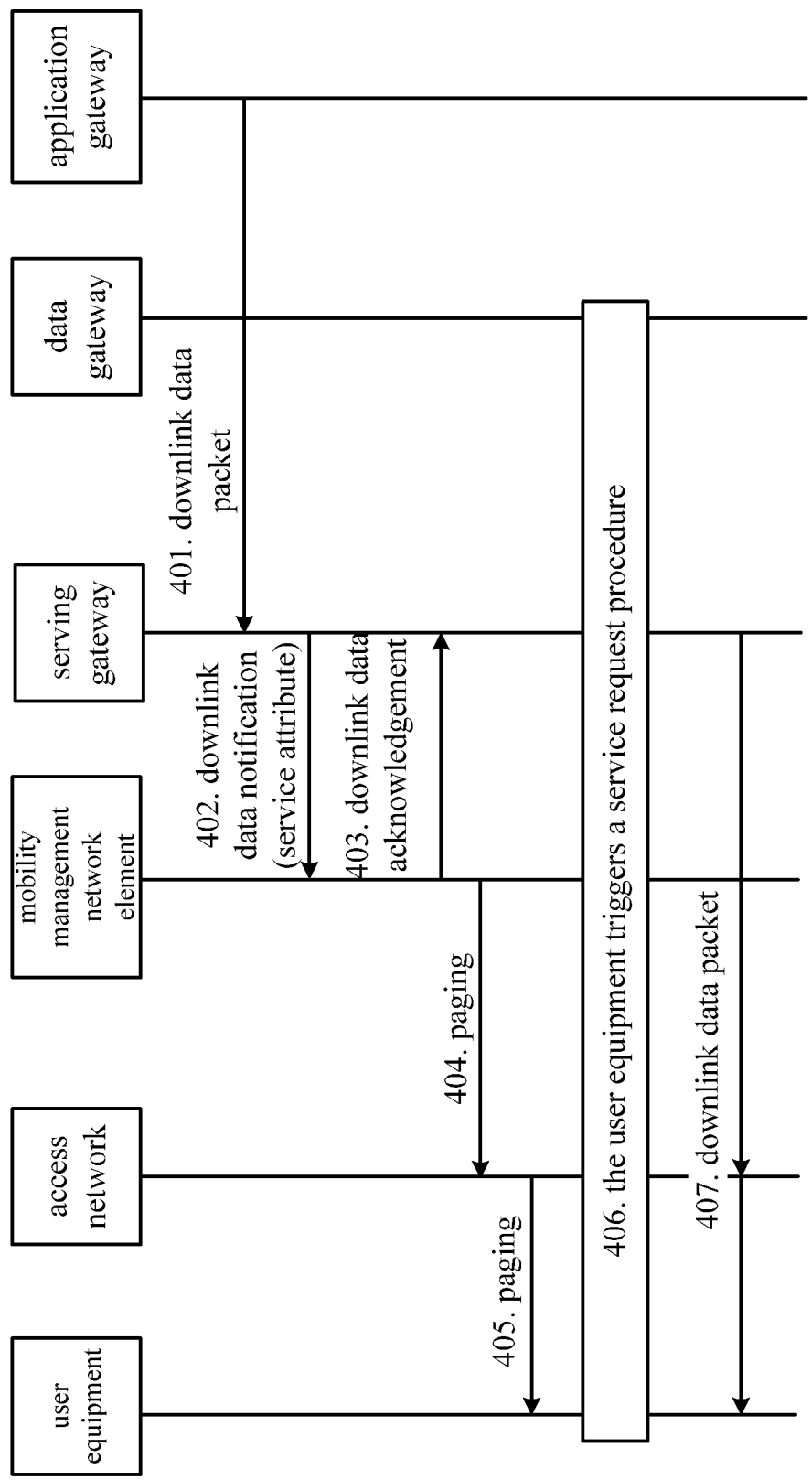
FIG. 4 is a flowchart of a paging processing method according to Embodiment 4 of the present invention.

FIG. 4 is a flowchart of a paging processing method according to a fourth embodiment of the present invention.

In FIG. 4, the mobility management network element may be an MME or an SGSN; the serving gateway stands for an SGW; the user equipment stands for a UE; the data gateway stands for a PGW; and the application gateway is an AF or a P-CSCF. The serving gateway is a policy enforcement point which implements the function of policy enforcement point in the prior policy control architecture.

Unlike the second and third embodiments of the present invention, in the fourth embodiment, the stored service type or service feature is obtained from the downlink service data flow context or bearer context.

FIG. 4 mainly includes the following steps:

Step 401: The serving gateway receives a data packet and obtains service attribute information corresponding to the data packet.

The serving gateway receives a downlink data packet sent by the application gateway via the data gateway.

In the embodiment of the present invention, with respect to the signaling message of voice call and short message service, the application gateway uses at least one different item in IP address, protocol type, port number, IPSec parameter index, DSCP/TOS, and Flow Label to encapsulate the downlink data packet.

After receiving a downlink data packet and knowing that the downlink tunnel corresponding to the data packet is invalid, the serving gateway buffers the data packet and obtains the service attribute information corresponding to the data packet. The service attribute information may be at least one of the following items: service type and service feature, as detailed hereunder.

Unlike the foregoing embodiments, in the embodiment of the present invention, the policy decision point of the network side generates different downlink service data flow filters for the signaling message of voice call and short message service according to at least one of IP address, protocol type, port number, IPSec parameter index, DSCP/TOS, and Flow Label sent by the application gateway, and sends the different downlink service data flow filters to the service gateway. Thereby, the serving gateway is able to differentiate the data packets of different services in granularity of bearer level or service data flow level. The serving gateway may generate different downlink traffic flow templates according to different downlink service data flow filters. The serving gateway matches the stored downlink service data flow filter or downlink traffic flow template according to protocol header information including the source IP address, destination IP address, source port number, destination port number, and protocol number in the downlink data packet, and then locates the corresponding downlink service data flow context according to the downlink service data flow filter to know that the downlink tunnel corresponding to the data packet is invalid. Then, the serving gateway obtains the service type or service feature corresponding to the downlink service data flow filter and stored in the downlink service data flow context, and uses the obtained service type or service feature as the service attribute information. Or, the serving gateway locates the corresponding bearer context according to the downlink traffic flow template to know that the downlink tunnel corresponding to the data packet is invalid, then obtains the service type or service feature corresponding to the downlink traffic flow template and stored in the bearer context, and uses the obtained service type or service feature as the service attribute information.

Further, the serving gateway can know the connection type corresponding to the data packet according to the information, such as APN, stored in the downlink service data flow context, or bearer context, or user context. Corresponding to the specific connection type, such as the connection type of IMS services, the serving gateway may obtain the service type or service feature corresponding to the downlink service data flow filter and stored in the downlink service data flow context, or obtain the service type or service feature corresponding to the downlink traffic flow template and stored in the bearer context.

Step 402: The SGW sends a downlink data notification message that includes the service attribute information to the mobility management network element.

The serving gateway sends the service attribute information to the mobility management network element via a downlink data notification message. The service attribute information is at least one of service type and service feature.

The service type may be described by an enumerated value. For example, the enumerated value "10" indicates the signaling message of voice call and the enumerated value "17" indicates the message of short message service. Or, the service type may be expressed by different bits in a field. For example, the value "1" of the first bit indicates the signaling message of voice call and the value "1" of the second bit indicates the message of short message service.

The service feature (such as the service with high priority or short waiting time) may be described by one enumerated value. For example, the enumerated value "1" indicates the service of a high priority or short waiting time and the enumerated value "2" indicates the service of a low priority or long waiting time; or the service feature may be expressed by different bits in a field. For example, the value "1" of the first bit indicates the service of a high priority or short waiting time and the value "1" of the second bit indicates the service of a low priority or long waiting time. This is not limited by the embodiment of the present invention.

Step 403: The mobility management network element sends a downlink data acknowledgement message to the serving gateway, acknowledging reception of the downlink data notification message of the serving gateway.

Steps 404 and 405: The mobility management network element uses different paging policies, according to the service attribute information, to page the user equipment in the idle state.

After obtaining the service attribute information, the mobility management network element uses different paging policies, according to the different service attribute information, to page the user equipment in the idle state. For voice call and short message service differentiated according to the service attribute information, when resources are congested, the mobility management network element initiates paging for the service data flow of voice call preferentially. The paging for a voice call service may be sent in the entire TA list from the beginning, and the paging for short message service is sent first in a TA where the UE is more probably located in the TA list.

Step 406: After the user equipment receives the paging, the user equipment initiates a service request procedure to restore the signaling connection and user plane bearers with the network side and transits to the connected state.

Step 407: After the downlink tunnel is valid, the serving gateway sends the buffered data packet to the user equipment.

From the fourth embodiment, it is apparent that, in the technical solution of the embodiment of the present invention, the downlink data notification message sent to the mobility management network element includes at least one of the service type and service feature as the content of service attribute information, and after obtaining the service attribute information, the mobility management network element may initiate paging of the user equipment based on different policies according to the service attribute information, which overcomes the defect caused by the use of a uniform paging policy because services cannot be differentiated in the prior art and enables prior establishments of some important services and services with high priority, thus improving the quality of service provided to the subscriber and reducing the cost of paging the user equipment by the network side.

Figure 5:
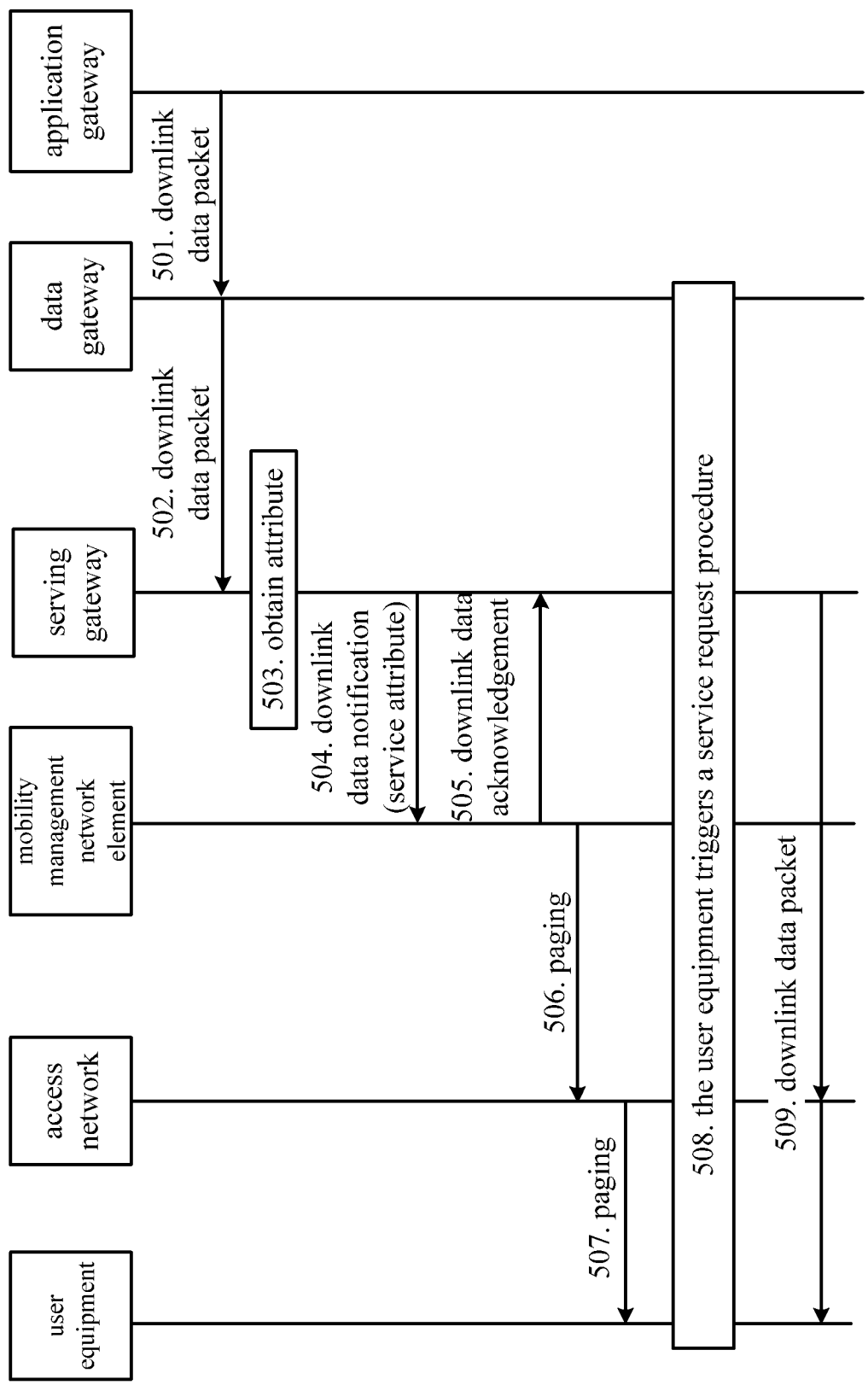
FIG. 5 is a flowchart of a paging processing method according to Embodiment 5 of the present invention.

FIG. 5 is a flowchart of a paging processing method according to a fifth embodiment of the present invention.

In FIG. 5, the mobility management network element may be an MME or an SGSN; the serving gateway stands for an SGW; the user equipment stands for a UE; the date gateway stands for a PGW; and the application gateway is an AF or a P-CSCF. Unlike the fourth embodiment, in the fifth embodiment of the present invention, the data gateway is a policy enforcement point which implements the function of policy enforcement point in the prior policy control architecture.

FIG. 5 mainly includes the following steps:

Step 501: The data gateway receives a data packet and obtains service attribute information corresponding to the data packet.

The data gateway receives a downlink data packet sent by the application gateway.

In the embodiment of the present invention, with respect to the signaling message of voice call and short message service, the application gateway uses at least one different item in IP address, protocol type, port number, IPSec parameter index, DSCP/TOS, and Flow Label to encapsulate the downlink data packet.

The data gateway obtains the service attribute information corresponding to the data packet after receiving the downlink data packet. The service attribute information may be at least one of the following items: service type and service feature, as detailed hereunder.

(1) In the embodiment of the present invention, the policy decision point on the network side generates different downlink service data flow filters for the signaling message of voice call and short message service according to at least one of IP address, protocol type, port number, IPSec parameter index, DSCP/TOS, and Flow Label sent by the application gateway, and sends the different downlink service data flow filters to the data gateway. The data gateway may generate different downlink traffic flow templates according to the different downlink service data flow filters. The data gateway matches the stored downlink service data flow filter or downlink traffic flow template according to protocol header information including the source IP address, destination IP address, source port number, destination port number, and protocol number in the downlink data packet, and then locates the downlink service data flow context according to the downlink service data flow filter. Then, the data gateway obtains the service type or service feature corresponding to the downlink service data flow filter and stored in the downlink service data flow context, and uses the obtained service type or service feature as the service attribute information. Or, the data gateway locates the corresponding bearer context according to the downlink traffic flow template, then obtains the service type or service feature corresponding to the downlink traffic flow template and stored in the bearer context, and uses the obtained service type or service feature as the service attribute information.

Further, the data gateway can know the connection type corresponding to the data packet according to the information, such as APN, stored in the downlink service data flow context, or bearer context, or user context. Corresponding to the specific connection type, such as the connection of IMS services, the data gateway may obtain the service type or service feature corresponding to the downlink service data flow filter and stored in the downlink service data flow context, or obtain the service type or service feature corresponding to the downlink traffic flow template and stored in the bearer context.

The data gateway sets a value of the DSCP/TOS or Flow Label field at the outer IP layer to the value corresponding to the service attribute when encapsulating the outer IP layer for the received downlink data packet according to the obtained service type or service feature.

The value of the DSCP/TOS or Flow Label field in the downlink data packet set to the value corresponding to the service attribute may be differentiating through different enumerated values or bits. For example, the enumerated value "10" indicates the signaling message of voice call and the enumerated value "17" indicate the message of short message service; or the value "1" of the first bit indicates the signaling message of voice call and the value "1" of the second bit indicates the message of short message service.

(2) With respect to the signaling message of voice call and short message service, the application gateway uses different DSCP/TOS or Flow Label fields to encapsulate the data packet. The policy decision point on the network side performs no special processing on the signaling message of voice call and short message service, but generates the same downlink service data flow filter and sends the downlink service data flow filter to the data gateway.

In this case, when the data gateway encapsulates the received downlink data packet with the outer IP layer, the data gateway sets a value of the DSCP/TOS or Flow Label field at the outer IP layer to the corresponding value of the DSCP/TOS or Flow Label field at the IP layer of the received downlink data packet.

Step 502: The data gateway sends the data packet to the serving gateway.

Step 503: The serving gateway receives the data packet and obtains service attribute information corresponding to the data packet.

After receiving a downlink data packet and knowing that the downlink tunnel corresponding to the data packet is invalid, the serving gateway buffers the data packet and obtains the service attribute information corresponding to the data packet. The service attribute information may be at least one of the following items: DSCP/TOS, Flow Label, service type, and service feature, as detailed hereunder.

(1) The serving gateway directly obtains the DSCP/TOS or Flow Label of the data packet from the outer IP layer of the downlink data packet as the service attribute information. The serving gateway may obtain the service attribute information after a deep packet inspection according to the length or feature of the data packet. The outer IP layer is an IP layer encapsulated by the data gateway outside the received downlink data packet.

(2) Based on (1), the serving gateway obtains the service type according to a mapping relationship between the DSCP/TOS or Flow Label of the data packet and the service type and uses the obtained service type as the service attribute information.

(3) Based on (1), the serving gateway obtains the service feature according to a mapping relationship between the DSCP/TOS or flow label of the data packet and the service feature and uses the obtained service feature as the service attribute information.

Step 504: The serving gateway sends a downlink data notification message that includes the service attribute information to the mobility management network element.

The serving gateway sends the service attribute information to the mobility management network element via a downlink data notification message. The service attribute information may be at least one of the following items: DSCP/TOS, Flow Label, service type, and service feature of the data packet.

The service type may be described by an enumerated value. For example, the enumerated value "10" indicates the signaling message of voice call and the enumerated value "17" indicates the message of short message service. Or, the service type may be expressed by different bits in a field. For example, the value "1" of the first bit indicates the signaling message of voice call and the value "1" of the second bit indicates the message of short message service.

The service feature (such as the service with high priority or short waiting time) may be described by one enumerated value. For example, the enumerated value "1" indicates the service of a high priority or short waiting time and the enumerated value "2" indicates the service of a low priority or long waiting time; or the service feature may be expressed by different bits in a field. For example, the value "1" of the first bit indicates the service of a high priority or short waiting time and the value "1" of the second bit indicates the service of a low priority or long waiting time. This is not limited by the embodiment of the present invention.

Step 505: The mobility management network element sends a downlink data acknowledgement message to the serving gateway, acknowledging reception of the downlink data notification message of the serving gateway.

Step 506-507: The mobility management network element uses different paging policies, according to the service attribute information, to page the user equipment in the idle state.

After obtaining the service attribute information, the mobility management network element uses different paging policies, according to the different service attribute information, to page the user equipment in the idle state. For voice call and short message service differentiated according to the service attribute information, the mobility management network element initiates paging to the user equipment for the service data flow of voice call preferentially. When resources are congested, the paging for a voice call service may be sent in the entire TA list from the beginning, and the paging for short message service is sent first in a TA where the user equipment is more probably located in the TA list.

If the included service attribute information is the DSCP/TOS or Flow Label of the data packet, the mobility management network element needs to pre-configure the service type or service feature corresponding to the parameters, and then the mobility management network element can differentiate the service type or service feature according to the mapping relationship and use different paging policies to page the user equipment in the idle state according to the service type or service feature.

Step 508: After the user equipment receives the paging, the user equipment initiates a service request procedure to restore the signaling connection and user plane bearers with the network side and transits to the connected state.

Step 509: After the downlink tunnel is valid, the serving gateway sends the buffered data packet to the user equipment.

From the fifth embodiment, it is apparent that, in the technical solution of the embodiment of the present invention, the downlink data notification message sent to the mobility management network element includes at least one of DSCP/TOS, flow label, service type, and service feature as the content of service attribute information, and after obtaining the service attribute information, the mobility management network element may initiate paging of the user equipment based on different policies according to the service attribute information, which overcomes the defect caused by the use of a uniform paging policy because services cannot be differentiated in the prior art and enables prior establishments of some important services and services with high priority, thus improving the quality of services provided to the user equipment and reducing the cost of paging the user equipment by the network side.

The paging processing method provided by the foregoing embodiments of the present invention has been described in detail, and accordingly, the embodiments of the present invention provide a communication apparatus and a communication system.

Figure 6:
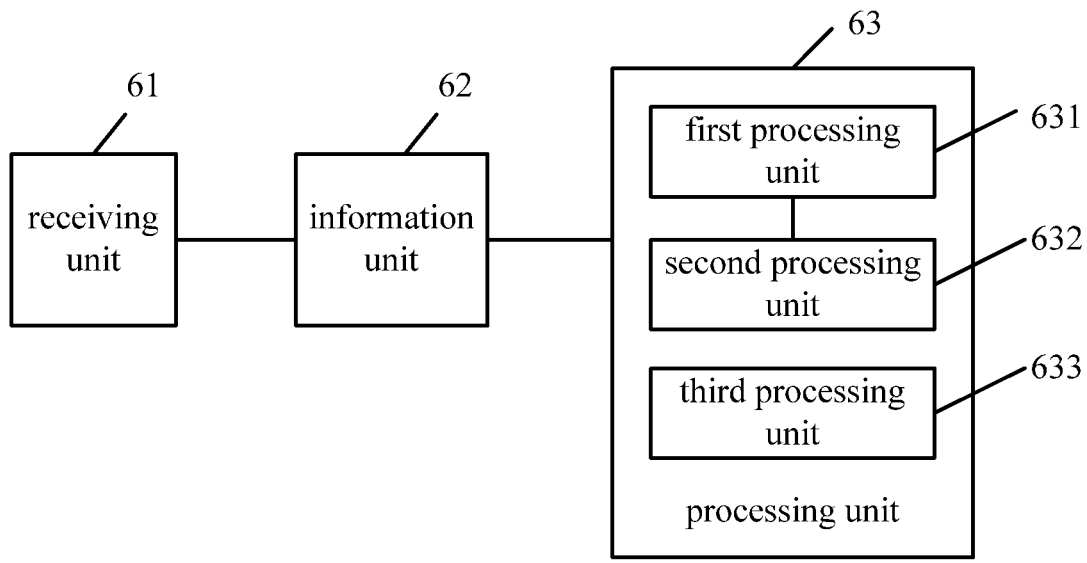
FIG. 6 is a schematic structure diagram of a first communication apparatus according to an embodiment of the present invention.

FIG. 6 is a schematic structure diagram of a first communication apparatus according to an embodiment of the present invention.

As shown in FIG. 6, the communication apparatus includes:

a receiving unit 61, configured to receive a downlink data notification message, where the downlink data notification message includes service attribute information of a downlink data packet;

an information unit 62, configured to obtain the service attribute information; and a processing unit 63, configured to initiate paging of the user equipment based on different policies according to the service attribute information.

Further, the service attribute information of a downlink data packet included in the downlink data notification message received by the receiving unit 61 includes at least one of the following items: access point name APN, evolved packet system bearer identity EBI, quality of service class identifier QCI, linked bearer identity LBI, and service identifier SI.

The processing unit 63 includes a first processing unit 631 and a second processing unit 632.

The first processing unit 631 is configured to locate a bearer context according to the EBI to obtain the corresponding APN or QCI, or locate a bearer context according to the LBI to obtain the corresponding APN.

The second processing unit 632 is configured to initiate paging of the user equipment based on different policies according to the APN or QCI obtained by the first processing unit 631.

Or, the processing unit 63 includes a third processing unit 633, configured to initiate paging of the user equipment based on different policies according to the APN, QCI, or SI in the notification message received by the receiving unit 61.

Or, the service attribute information of data included in the notification message received by the receiving unit 61 includes at least one of the following items: IP address, protocol type, port number, IP security IPSec parameter index, differentiated services codepoint priority DSCP/type of service TOS, flow label Flow Label, service type, and service feature of the data packet.

The processing unit 63 includes a first processing unit 631 and a second processing unit 632.

The first processing unit 631 is configured to obtain the service type according to a pre-configured mapping relationship between the service type and the IP address, protocol type, port number, IPSec parameter index, DSCP/TOS, or Flow Label of the data packet, or obtain the service feature according to a pre-configured mapping relationship between the service feature and the IP address, protocol type, port number, IPSec parameter index, DSCP/TOS, or Flow Label of the data packet.

The second processing unit 632 is configured to initiate paging of the user equipment based on different policies according to the service type or service feature obtained by the first processing unit 631.

Or, the processing unit 63 includes a third processing unit 633, configured to initiate paging of the user equipment based on different policies according to the service type or service feature in the notification message received by the receiving unit 61.

Figure 7:
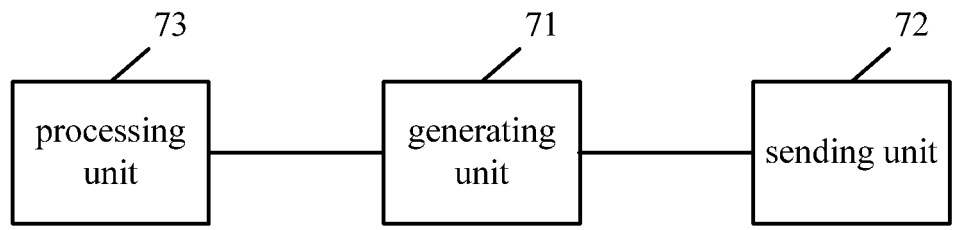
FIG. 7 is a schematic structure diagram of a second communication apparatus according to an embodiment of the present invention.

FIG. 7 is a schematic structure diagram of a second communication apparatus according to an embodiment of the present invention.

As shown in FIG. 7, the communication apparatus includes:

a generating unit 71, configured to generate a downlink data notification message, where the downlink data notification message includes service attribute information of data; and a sending unit 72, configured to send the notification message generated by the generating unit 71, so that a mobility management network element initiates paging of the user equipment based on different policies according to the service attribute information.

The communication apparatus further includes a processing unit 73.

IMPLEMENTATION 1

The processing unit 73 is configured to:

after a data packet is received, obtain the service attribute information of data from the user context, bearer context, or service data flow context corresponding to the data packet, where the service attribute information includes at least one of the following items: access point name APN, evolved packet system bearer identity EBI, quality of service class identifier QCI, linked bearer identity LBI, and service identifier SI; and send the obtained service attribute information to the generating unit 71.

IMPLEMENTATION 2

The processing unit 73 is configured to:

receive a data packet;

obtain service attribute information directly from the data packet, where the service attribute information includes at least one of the following items: IP address, protocol type, port number, IPSec parameter index, DSCP/TOS, and Flow Label of the data packet;

obtain a service type according to a pre-configured mapping relationship between the service type and the IP address, protocol type, port number, IPSec parameter index, DSCP/TOS, or Flow Label of the data packet, and use the obtained service type as the service attribute information of data;

obtain a service feature according to a pre-configured mapping relationship between the service feature and the IP address, protocol type, port number, IPSec parameter index, DSCP/TOS, or Flow Label of the data packet, and use the obtained service feature as the service attribute information of data; or obtain service attribute information according to the service data flow contexts corresponding to different service data flow filters or the bearer contexts corresponding to different downlink traffic flow templates, where the service attribute information is service type or service feature; and send the obtained service attribute information to the generating unit 71.

Figure 8:
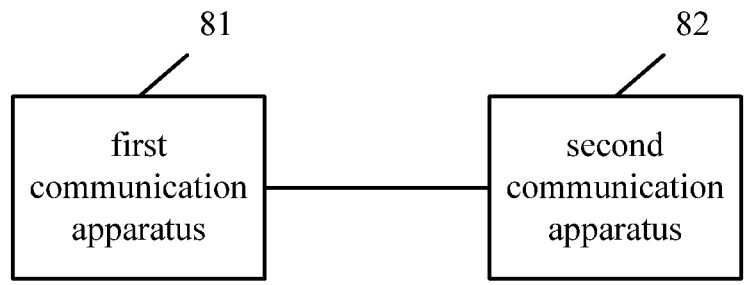
FIG. 8 is a schematic structure diagram of a communication system according to an embodiment of the present invention.

FIG. 8 is a schematic structure diagram of a communication system according to an embodiment of the present invention.

As shown in FIG. 8, the communication system includes:

a first communication apparatus 81, configured to send a downlink data notification message, where the downlink data notification message includes service attribute information of data; and a second communication apparatus 82, configured to receive the downlink data notification message sent by the first communication apparatus 81 and obtain the service attribute information, and initiate paging of the user equipment based on different policies according to the service attribute information.

The service attribute information of data included in the downlink data notification message sent by the first communication apparatus 81 includes at least one of the following items: access point name APN, evolved packet system bearer identity EBI, quality of service class identifier QCI, linked bearer identity LBI, and service identifier SI.

The communication apparatus 82 may be configured to locate a bearer context according to the EBI to obtain the corresponding APN or QCI and initiate paging of the user equipment based on different policies according to the APN or QCI; or locate a bearer context according to the LBI to obtain the corresponding APN and initiate paging of the user equipment based on different policies according to the APN.

Or, the service attribute information of data included in the downlink data notification message sent by the first communication apparatus 81 includes at least one of the following items: IP address, protocol type, port number, IP security IPSec parameter index, differentiated services codepoint priority DSCP/type of service TOS, flow label Flow Label, service type, and service feature of the data packet.

The second communication apparatus 82 may be configured to:

initiate paging of the user equipment based on different policies according to the service type or service feature;

obtain a service type according to a pre-configured mapping relationship between the service type and the IP address, protocol type, port number, IPSec parameter index, DSCP/TOS or Flow Label of the data packet, and initiate paging of the user equipment based on different policies according to the service type; or obtain a service feature according to a pre-configured mapping relationship between the service feature and the IP address, protocol type, port number, IPSec parameter index, DSCP/TOS or Flow Label of the data packet, and initiate paging of the user equipment based on different policies according to the service feature.

The second communication apparatus 82 has a structure shown in FIG. 6 as detailed in the foregoing embodiment.

To sum up, in the technical solution of the embodiment of the present invention, the service attribute information of data is included in a downlink data notification message, and after the service attribute information is obtained, paging of different policies may be initiated according to the service attribute information, which overcomes the defect caused by the use of a uniform paging policy because services cannot be differentiated in the prior art and enables some important services and services with high priority that need be considered preferentially to be set up preferentially, thus improving the quality of service provided to the subscriber.

Persons of ordinary skill in the art understand that all or part of the steps in the methods provided by the foregoing embodiments of the present invention may be implemented by hardware under the instruction of a program. The program may be stored in a computer readable storage medium, such as a read only memory (ROM, Read Only Memory), a random access memory (RAM, Random Access Memory), a magnetic disk, or a compact disk-read only memory.

Detailed above are the paging processing method, communication apparatus, and communication system provided by the embodiments of the present invention. Although the principle and implementation of the present invention are described with reference to exemplary embodiments, the embodiments are only intended to help understand the method and core idea of the present invention. In addition, with respect to the implementation and applicability of the present invention, modifications and variations may be made by persons of ordinary skill in the art according to the idea of the present invention. Therefore, the specification shall not be construed as a limitation on the present invention.

What is claimed is:

1. A paging processing method, comprising:
receiving, by a mobility management network element, a downlink data notification message, wherein the downlink data notification message includes an evolved packet system bearer identity (EBI) of a downlink data packet;
obtaining, by the mobility management network element, the EBI from the downlink data notification message;
identifying, by the mobility management network, a bearer context according to the EBI;
obtaining, by the mobility management network, an access point name (APN) corresponding to the downlink data packet from the bearer context; and
initiating, by the mobility management network, paging of a user equipment based on a policy corresponding to the APN.

2. The method according to claim 1, wherein the EBI is obtained by a serving gateway from a user context corresponding to the downlink data packet.

3. The method according to claim 1, wherein the EBI is obtained by a bearer context corresponding to the downlink data packet.

4. The method according to claim 1, wherein the EBI is obtained by a service data flow context corresponding to the downlink data packet.

5. A mobility management network element, comprising:
a receiver, configured to receive a downlink data notification message, wherein the downlink data notification message includes an evolved packet system bearer identity (EBI) of a downlink data packet; and
a processor, configured to obtain the EBI from the downlink data notification message, to identify a bearer context according to the EBI, obtain an access point name (APN) corresponding to the downlink data packet from the bearer context, and to initiate paging of a user equipment based on a policy corresponding to the APN.

6. A serving gateway, comprising:
a processor, configured to generate a downlink data notification message, wherein the downlink notification message includes an evolved packet system bearer identity (EBI) of a downlink data packet; and
a transmitter, configured to send the downlink data notification message generated by the processor, so that a mobility management network element obtains the EBI from the downlink data notification message, identifies a bearer context according to the EBI, obtains an access point name (APN) corresponding to the downlink data packet from the bearer context, and initiates paging of a user equipment based on a policy corresponding to APN.

7. The serving gateway according to claim 6, wherein the processor is further configured to obtain the EBI of the downlink data packet from a user context corresponding to the downlink data packet.

8. The serving gateway according to claim 6, wherein the processor is further configured to obtain the EBI of the downlink data packet from a bearer context corresponding to the downlink data packet.

9. The serving gateway according to claim 6, wherein the processor is further configured to obtain the EBI of the downlink data packet from a service data flow context corresponding to the downlink data packet.

10. A communication system, comprising:
- a serving gateway, configured to send a downlink data notification message, wherein the downlink data notification message includes an evolved packet system bearer identity (EBI) of a downlink data packet; and
- a mobility management network element, configured to receive the downlink data notification message sent by the serving gateway, to obtain the EBI from the downlink data notification message, to identify a bearer context according to the EBI, to obtain an access point name (APN) corresponding to the downlink data packet from the bearer context, and to initiate paging of a user equipment based on a policy corresponding to the APN.

* * * * *